A. A. CAILLE & H. B. CONOVER.
VENDING MACHINE.
APPLICATION FILED MAY 13, 1911.
1,010,231.
Patented Nov. 28, 1911.
5 SHEETS—SHEET 3.
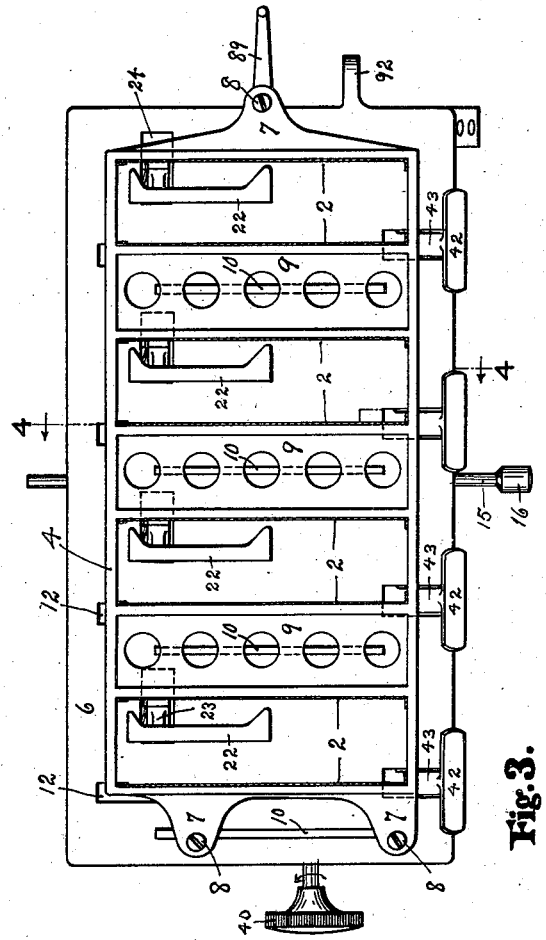
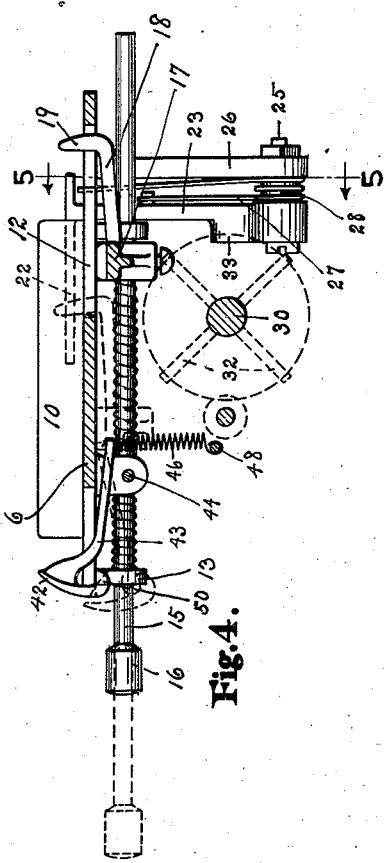
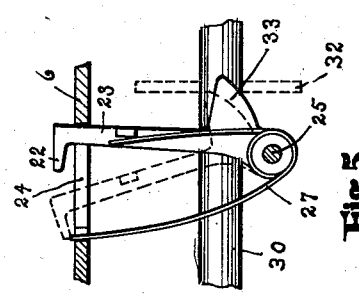

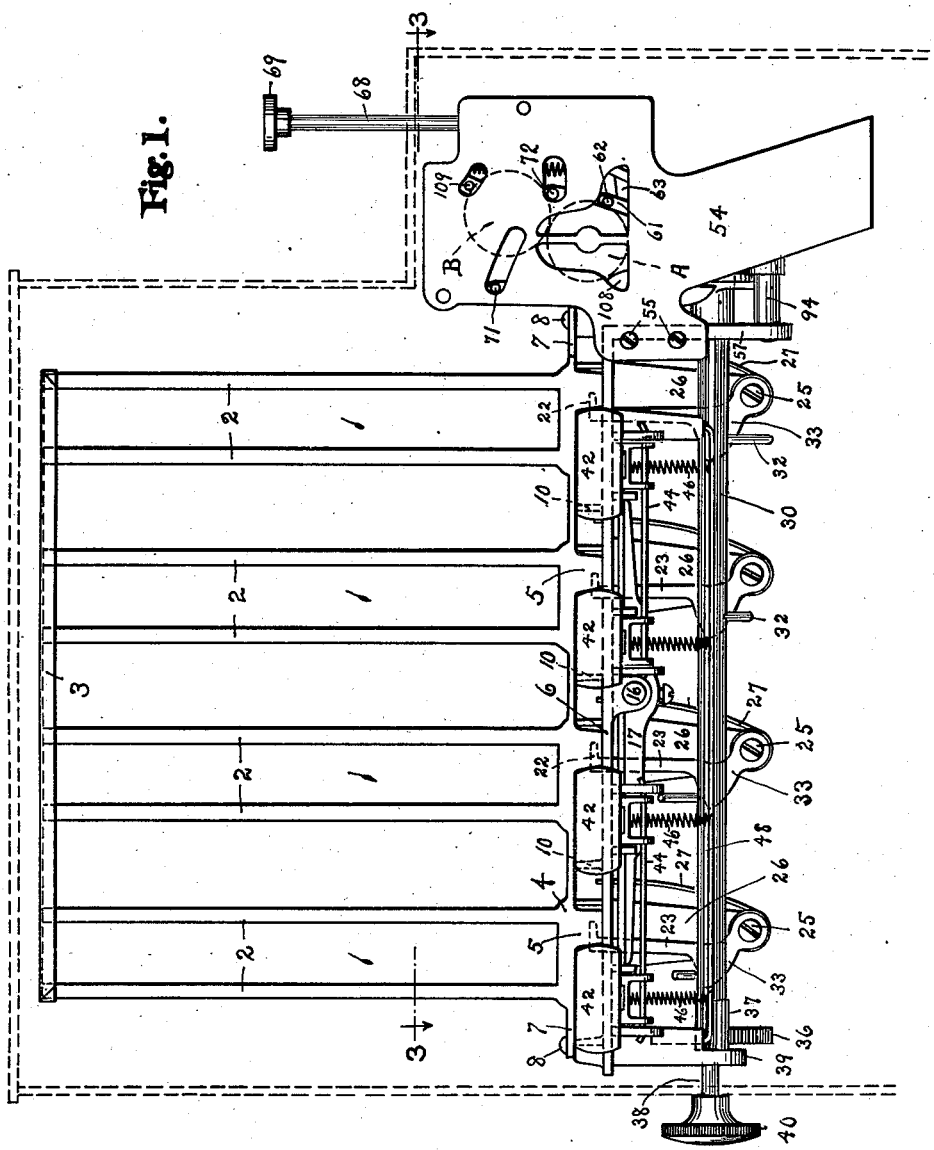

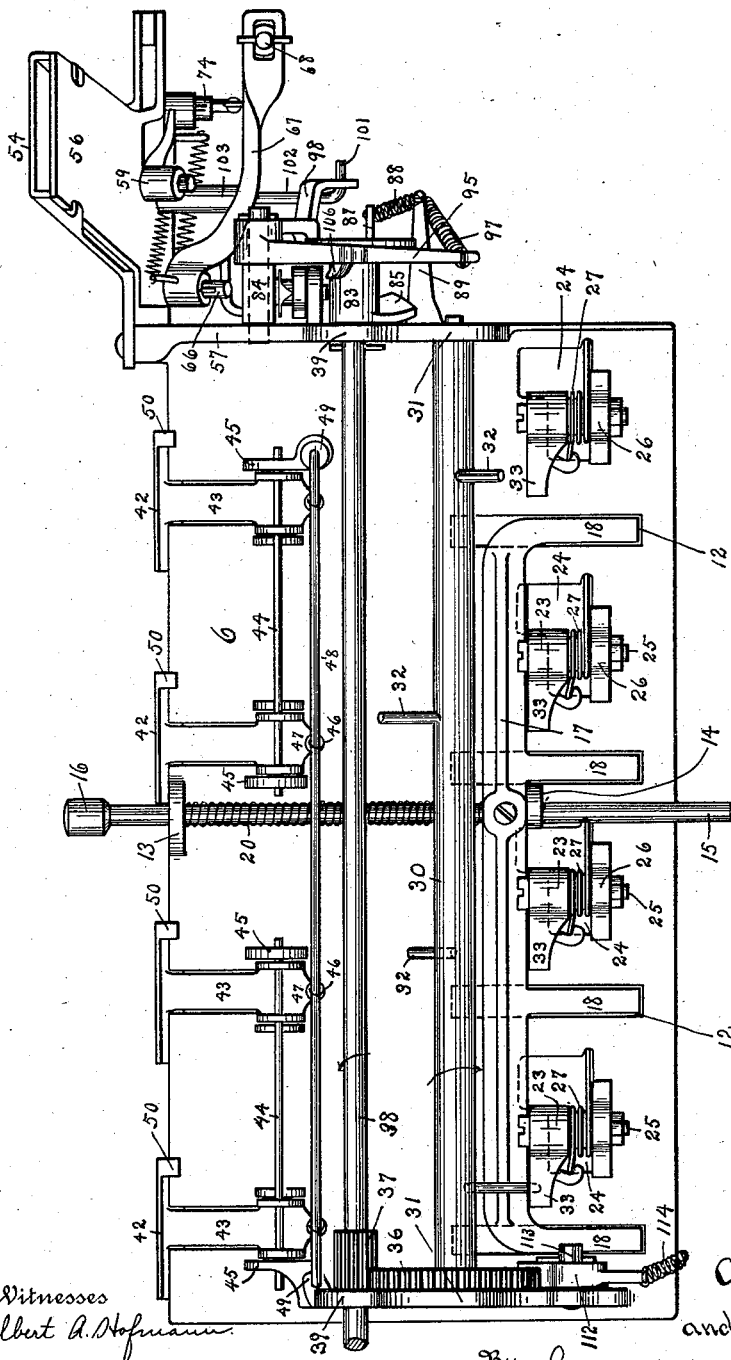

A. A. CAILLE & H. B. CONOVER.
VENDING MACHINE.
APPLICATION FILED MAY 13, 1911.
1,010,231.
Patented Nov. 28, 1911.
5 SHEETS—SHEET 4.
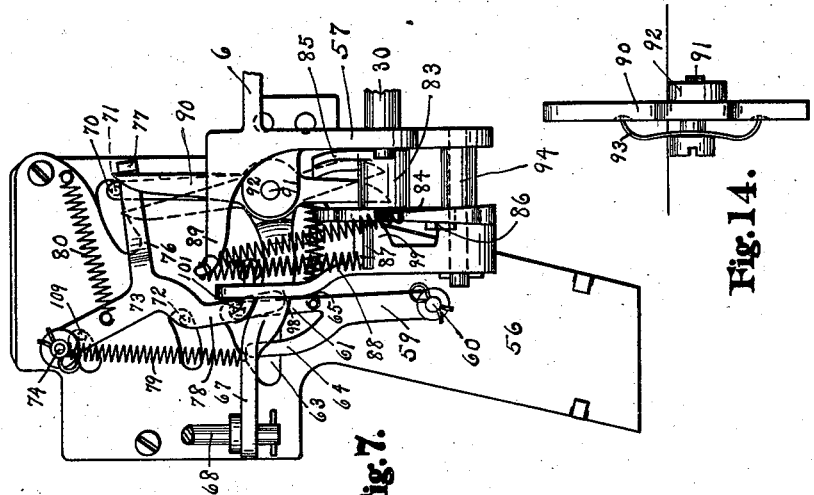
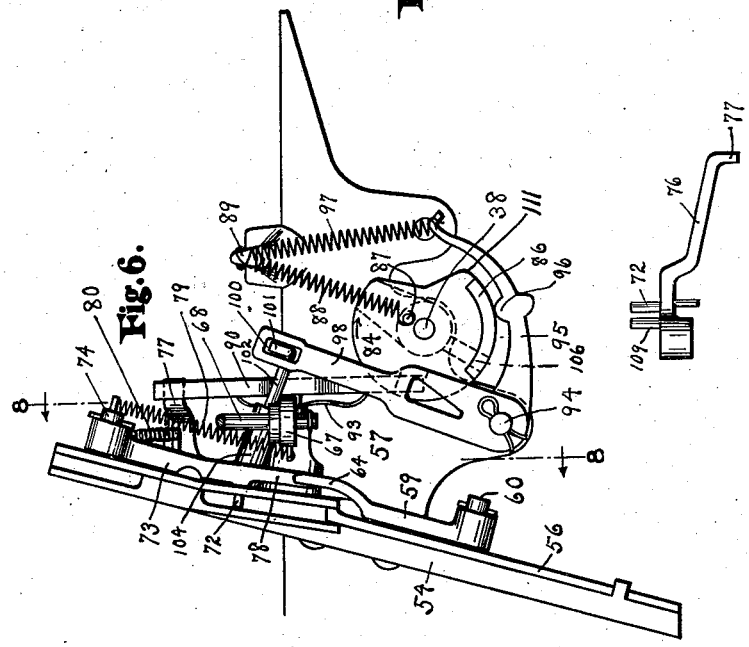
Witnesses
Albert A. Hofmann
E. M. Brown
Inventors
A. A. Caille and
H. B. Conover.
By Edward N. Pagelsen,
Attorney

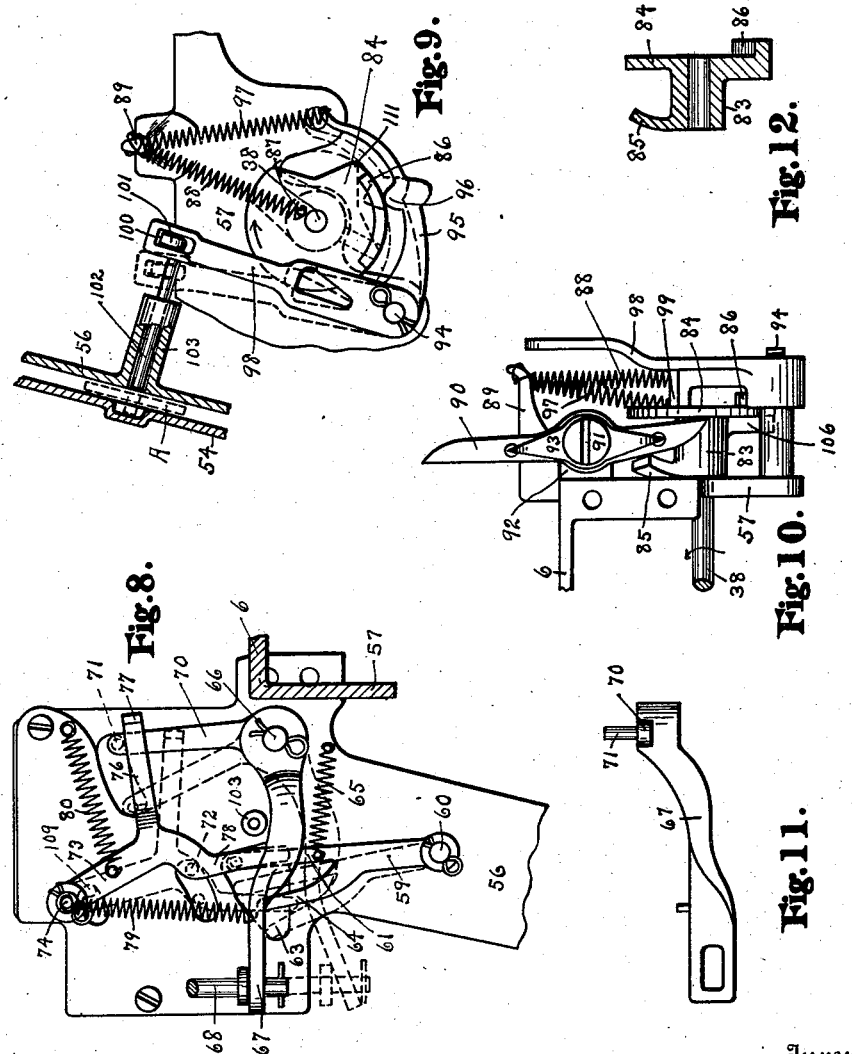

UNITED STATES PATENT OFFICE.

AUGUSTE ARTHUR CAILLE AND HOWARD B. CONOVER, OF DETROIT, MICHIGAN.

VENDING-MACHINE.

1,010,231. Specification of Letters Patent. Patented Nov. 28, 1911.

Application filed May 13, 1911. Serial No. 626,931.

*To all whom it may concern:*

Be it known that we, AUGUSTE ARTHUR CAILLE and HOWARD B. CONOVER, citizens of the United States, and residents of Detroit, in the county of Wayne and State of Michigan, have invented a new and useful Vending-Machine, of which the following is a specification.

This device relates to means for vending small articles such as packages of tickets, stamps, cigarettes, chewing gum and confectionery, and its object is to provide a vending machine with a series of receptacles which may be filled simultaneously and which will be drawn upon in sequence, to provide a vending machine having great capacity in proportion to its height, which shall be proof against pilferers, and which shall be strong and easily maintained.

This invention consists in a case, a series of receptacles placed side by side, a laterally movable ejector in the bottom of each receptacle, means to carry the thus ejected article out of the case, a manually rotatable device for operating the ejectors in sequence, a locking device for preventing such rotation, and a coin controlled releasing device for the stop mechanism.

It further consists in the details of construction illustrated in the accompanying drawings and particularly pointed out in the claims.

In the accompanying drawings, Figure 1 is a front elevation of this device with the case shown in dotted lines. Fig. 2 is a bottom view of the same. Fig. 3 is a plan of the base and receptacles. Fig. 4 is a section on the line 4—4 of Fig. 3. Fig. 5 is a section on the line 5—5 of Fig. 4. Fig. 6 is a side elevation of the stopping device and the releasing mechanism therefor. Fig. 7 is a rear elevation thereof. Fig. 8 is a section on the line 8—8 of Fig. 6. Figs. 9 to 14 inclusive are details of the stop and release mechanism.

Similar reference characters refer to like parts throughout the several views.

Any desired form of case may be employed to inclose this mechanism. The receptacles 1 for the articles to be vended are preferably formed of sides 2 of thin sheet metal facing each other, the upper edges connected by bars 3, and the lower edges united by a frame 4. This frame has feet 5 resting on the base 6, and lugs 7 through which screws 8 extend into the base. Fig. 3 shows cross bars 9 between the receptacles, which bars may rest on the upwardly extending guide ribs 10. These guide ribs are slightly higher than the thickness of the article vended so that it may freely move beneath the frame 4. The base 6 is in the form of a flat plate having the upwardly extending parallel ribs 10, downwardly extending lugs for various purposes, and slots 12, parallel to the ribs 10. Fig. 2 shows perforated lugs 13 and 14 on the lower side of the base, in which lugs is slidable a rod 15 which has a knob 16 on its front end. Connected to this rod between the lugs is a cross-head 17, having arms 18 provided with upwardly extending fingers 19 which extend through the slots 12. A spring 20 normally holds the cross head 17 in such position that the fingers 19 are in the rear of the articles in the receptacles. It will be noticed in Fig. 3 that these slots 12 are to the left of the receptacles so that these fingers 19 may normally move without engaging the articles to be vended.

In the bottom of each receptacle is found a laterally movable ejector plate 22 for the articles to be vended. These ejectors have arms 23 which extend through the slots 24 in the base. (Figs. 3 and 4). The lower ends of these arms are revoluble on the pins 25 carried by the lower ends of the brackets 26 on the lower side of the base. Springs 27 on the hubs 28 of these brackets normally hold the ejectors in the positions shown in Figs. 3 and 5.

A main shaft 30 is journaled in the lugs 31 on the bottom of the base and carries arms 32, one for each receptacle, and preferably equally spaced circumferentially. These arms are positioned to engage the cams 33 on the arms 23 of the ejectors in such a manner that the ejectors will be swung to the right in Fig. 3 (left in Fig. 5) entirely out of the receptacles. This permits the lowest article in the receptacle to fall onto the base plate. When an arm 32 has passed its particular cam 33, the spring 27 will return the ejector to normal position, thereby forcing the lowest article in the receptacle into the path of the proper finger 19 of the cross head. The rod 15 is then pulled forward to carry the article out of the machine.

The main shaft 36 carries a gear 36 which meshes with a pinion 37 on the driving shaft 38, journaled in the lugs 39. On the left end of this driving shaft is a knurled button 40 by means of which this shaft and the main shaft may be turned. On the right end of this driving shaft is a mechanism which stops the shaft at the end of one full revolution.

At the front of the frame 4 are a series of openings to permit the discharge of the vended article, which openings are normally closed by the small gates 42. These gates are on the front ends of the arms 43, pivoted on the rods 44, which rods are carried by the lugs 45 on the bottom side of the base 6. Springs 46 connect to the rear projections 47 of these arms and to the rod 48 carried by the lugs 49 on the base, and normally hold the gates over the openings. Small lips 50 (Fig. 2) prevent these gates from moving upward too far.

The operation of the ejecting device is as follows. The locking device at the right end of the driving shaft 38 having been released, the purchaser turns back the knob 40 one revolution. This turns the shaft 30 sufficiently for the next arm 32 to engage the adjacent cam 33 and move the ejector to the right away from under the articles in its receptacle. This permits the articles to fall so that the lowest rests on the base 6. When the arm 32 has passed the cam, the spring 27 returns the ejector to normal position, which, being of substantially the same height as the thickness of the articles to be vended, will push the lowest article to the left into the path of the finger 19, and resume its place under those still in the receptacle. The purchaser then pulls on the button 16 and draws the article toward him. The article will strike the proper gate 42 and force it outward and downward as shown in dotted lines in Fig. 4, the article passing out of the machine a sufficient distance to be grasped by the purchaser and fully removed, after which the spring 46 will return the gate 42 to normal position. At the next revolution of the button 40, another ejector 22 will be actuated so that an article will be taken from each receptacle in turn.

As a machine of the construction shown has the capacity of a single-receptacle machine three times as high, this construction is of great advantage where the permissible height is limited but where a little additional width is unobjectionable.

At the right end of the machine is a stopping and releasing mechanism for the shaft 38 adapted to be governed by a coin. A coin receiver consists of a front plate 54 secured to the base 6 by means of screws 55, and a rear plate 56, secured to the front plate. To this rear plate and to a bracket 57 on the base the various parts to be now described are mounted. As it is desirable to retain the coin A, (Fig. 1) which was last used to unlock the machine in such position that it will be visible to the next purchaser, and also that it may act as a stop for the next coin B, a small retainer 59 is pivoted at 60 on the rear plate. This retainer has two arms. One arm 61 has a forwardly extending finger 62, movable in slots 63 in the coin receiver and adapted to hold the lower coin until the other arm 64 is engaged by the arm 78 of main lever (which arm is normally just in the rear of the arm 61 of the retainer) and swung outward. A spring 65 returns this retainer in operative position.

Pivoted on the pin 66 carried by the rear plate is an actuating lever having an outwardly projecting arm 67 which carries a push rod 68, extending out of the case and provided with a button 69 at its upper end. This actuating lever also has an upwardly extending arm 70 which carries a forwardly projecting pin 71 adapted to engage the upper coin B and force it against the pins 72 and 109 projecting forward from the main lever 73. This lever is pivoted on the pin 74 on the rear plate and has two arms. One, 76 extends inwardly and has a rearwardly projecting finger 77 to engage the stop pawl 90. The other arm 78 extends downwardly and carries the pin 72. The outer end of this arm engages the arm 64 of the coin retainer 59 when swung by the push rod. A spring 79 normally holds up the arm 67 and the push rod 68, while the spring 80 holds the lower end of the arm 78 inward.

On the right end of the shaft 38 is a hub 83 having a cam disk 84 on its outer end and a cam flange 85 at its inner end. The disk carries a segmental flange 86 and a pin 87. A spring 88 connecting to this pin and to the arm 89 on the base completes the rotation of this shaft 38 when necessary. The stop pawl 90 is pivoted on the screw 91 carried by the lug 92 on the base. A spring 93 is mounted on this screw between the head and the pawl and frictionally holds the pawl in either of two positions.

On the pin 94 which projects from the bracket 57 is pivoted the stop lever having an arm 95 provided with a lug 96, which engages the rim of the cam disk 84. A spring 97 connects to this arm and to the arm 89. The other arm 98 of the stop lever has a shoulder 99 (Fig. 10) which may swing into the path of the flange 86. At the upper end of this arm 98 is a slot 100 into which the arm 101 on the rear end of the rod 102 extends. This rod is slidable in the hub 103 on the rear plate and is central with the coin A. On the inner side of the cam disk 84 is a lug or shoulder 106 (Fig. 10) adapted to be engaged by the lower end of the stop pawl 90.

This mechanism operates as follows. The first coin inserted falls to the position A in Fig. 1, resting against a shoulder 108 in the coin chute and against the pin 62 of the retainer 59. The shaft 38 is held locked by the lower end of the pawl 90 resting against the lug 106 on the inner face of the disk 84. Pushing down the rod 68 and swinging the arm 67 has no effect as the only connection between this member and the stop pawl is through the main lever and a coin in proper position. When the second coin is dropped into the chute, it will rest on the first and against the two forwardly projecting pins 72 and 109 on the main lever 73. When the rod 68 is depressed, the arm 67 is swung down (dotted lines Fig. 8) and the pin 71 on the arm 70 will move to the right, pushing this coin B outward, pressing it against the pins of the main lever 73 and swinging the same sufficiently to cause its lower arm 78 to engage the arm 64 of the retainer 59 and carry it outward. This releases the coin A. The other arm 76 of the main lever engages the upper end of the stop pawl 90 swinging the lower end inward out of the path of the lug 106 on the disk 84, releasing the disk and shaft 38. Upon the release of the plunger 68, the spring 79 will raise the arm 67 and the main lever will swing back to its original position, permitting the coin retainer 59 to move back to operative position. During this time the coin B is held between the pins 71, 72 and 109. But when the main lever and the retainer 59 stop, the pin 71 continues to recede, thus freeing the coin B which immediately falls to the position A. During all this time the lug 96 rests against the periphery of the disk 84 as shown in Fig. 9. The purchaser now turns the shaft 38 by means of the button 40 which soon brings the corner 111 of the disk to the lug 96. If the disk in the position A is perforated, as when an iron washer is used, the spring 97 will swing the arm 95 up, and the arm 98 outward, bringing the shoulder 99 (Fig. 10) into the path of the flange 86 on the disk, thus stopping the shaft. When the knob 40 is released, the spring 88 returns the parts to normal position. If the coin B is not perforated it will hold the arms 96 and 98 in the position shown in Fig. 6, with the shoulder 99 inside the path of the flange 86, when the shaft 38 can turn freely. At the first quarter of the revolution the lug 106 passes the lower end of the pawl 90. After the first half revolution the cam flange 85 engages the lower end of this stop pawl and swings it outward as shown in Fig. 10, where the arm remains in the path of the shoulder 99 until swung out of the path of the lug 106 by the arm 76 of the main lever. More than one revolution of the shaft 38 without the introduction of another coin is prevented by the rod 102, arm 98 and the shoulder 99 carried thereby as before described, the parts acting in the same manner as when the coin is perforated. Reverse revolution of the shafts is prevented by the pawl 112, pivoted on the pin 113, and held in engagement with the gear 31 by the spring 114. See lower left corner of Fig. 2.

Many changes in the construction of this device may be made by those skilled in the art to which this mechanism belongs without departing from the spirit of our invention. The proportions will depend upon the coins to be employed for releasing the locking mechanism and upon the size and character of the articles to be vended.

Having now explained our construction, what we claim as our invention and desire to secure by Letters Patent is:—

1. In a vending machine, the combination of a series of receptacles for the articles to be vended, a base for the same, a series of brackets projecting from the base, an ejector pivotally mounted below each receptacle on said brackets, manually operated means to actuate said ejectors in sequence, and means to withdraw the ejected articles from the machine.

2. In a vending machine, the combination of a series of receptacles for the articles to be vended, a frame for the lower end of the same, a base on which said frame is mounted, a series of ejectors, one for each receptacle, movably mounted on the base, a shaft and projecting arms revolubly mounted on the base in operable relation to the ejectors whereby the ejectors are actuated in sequence, a manually operable slidable cross head mounted on the base and having arms positioned to engage the ejected articles, and manually operable means for actuating said shaft.

3. In a vending machine, the combination of a series of properly spaced receptacles for the articles to be vended, an ejector for each of the receptacles, means to move said ejectors transversely of the receptacles to carry the articles to the spaces between the receptacles, a manually operable revoluble member to actuate said ejectors in sequence, means to stop said actuating member after each operation, and a manually operable slidable member for carrying the ejected articles out of the machine.

4. In a vending machine, the combination of a series of receptacles for the articles to be vended, a transversely movable ejector for each of the receptacles, a revoluble main shaft having circumferentially spaced arms, one for each ejector, a driving shaft, a mechanism on said driving shaft to stop the same at the end of one revolution, gears between the shafts whereby one revolution of the driving shaft will turn the main shaft the space between two arms, and manually operable means for withdrawing the article from the machine.

5. In a vending machine, the combination of a series of receptacles for the articles to be vended, a frame for the lower end of the same, a base on which the frame is mounted, a series of ejectors comprising pivotally mounted plates on which the articles normally rest, a shaft mounted below the base and having arms to move the ejector plates from below the articles, and thus permitting the lowest to fall to the base, a spring for each ejector to return the same to normal position and thereby eject the article on the base from the receptacle, said arms on the main shaft being circumferentially spaced to operate said ejectors in sequence, and a slidable member for moving such ejected articles from the machine.

6. In a vending machine, the combination of a series of receptacles for the articles to be vended, a transversely movable ejector for each of the receptacles, a revoluble main shaft having circumferentially spaced arms, one for each ejector, a driving shaft, a disk on the end of the driving shaft having lugs and cams, a stop-pawl movable into the path of a lug by a cam to cause the shaft to be stopped at the end of one revolution, means to release the pawl, gears between said shafts proportioned so that at one revolution of the driving shaft one arm on the main shaft will actuate an ejector, and a manually operable slidable member for carrying the articles from the machine.

7. In a vending machine, the combination of a series of receptacles for the articles to be vended formed of flanged sheet metal sides facing each other, a base on which said receptacles are mounted, an ejector for each receptacle, a manually operated shaft and circumferentially spaced arms to actuate said ejectors in sequence, and a slidable member below the receptacles manually operable to move the articles out of the machine.

8. In a vending machine, the combination of a series of receptacles positioned side by side, a frame uniting the lower end of the same, a base having upwardly projecting guide flanges upon which said frame is mounted, a main shaft mounted parallel to the face of the base and below the same, radial arms spaced circumferentially on said shaft, one for each receptacle, brackets projecting from the lower side of the base, one for each receptacle, arms pivoted thereon to swing parallel to the shaft and having cams in the paths of said arms, said arms extending through slots in said base, an ejector plate on the upper end of each arm upon which the articles in its receptacle normally rest, manually operable means to turn the shaft so its arms may swing said plates laterally from below said articles, permitting them to fall to the base, a spring for each arm adapted to return it to move the lowest article laterally, and manually operable means for carrying such ejected article out of the machine.

In testimony whereof we have signed this specification in the presence of two subscribing witnesses.

AUGUSTE ARTHUR CAILLE.
HOWARD B. CONOVER.

Witnesses:
T. L. SMITH, Jr.,
WALTER E. WHELAN.

---

Copies of this patent may be obtained for five cents each, by addressing the "Commissioner of Patents, Washington, D. C."